Feb. 10, 1953   A. L. PARKER   2,628,060
ROTARY PLUG VALVE SEAT
Filed May 15, 1945   3 Sheets-Sheet 1

Inventor
Arthur L Parker, deceased,
By Helen M. Parker, executrix
By Mason, Porter & Diller
Attorneys Feb. 10, 1953    A. L. PARKER    2,628,060
ROTARY PLUG VALVE SEAT
Filed May 15, 1945    3 Sheets-Sheet 2
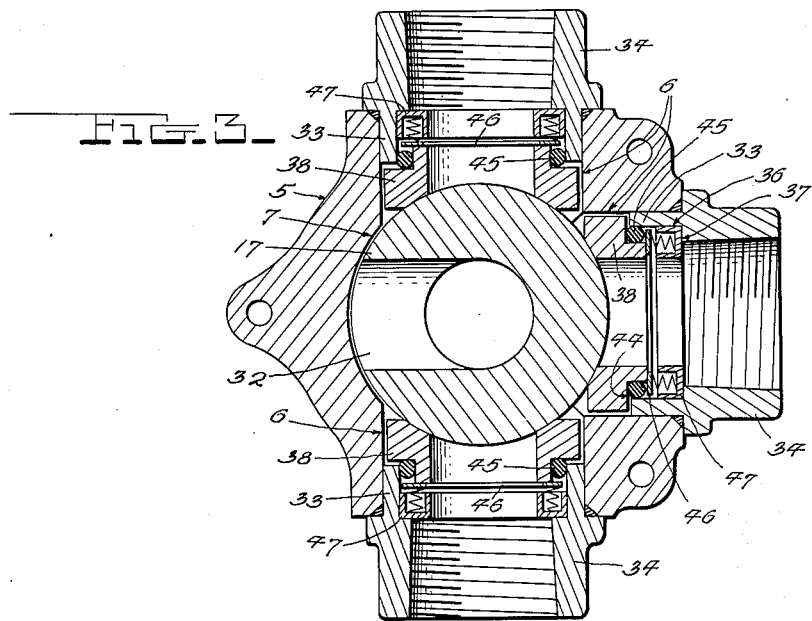
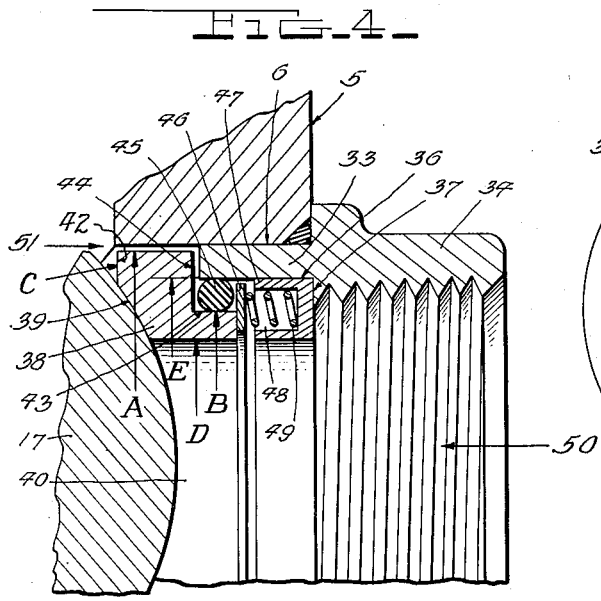
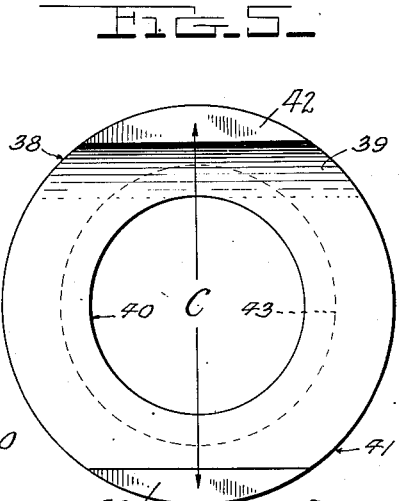
Inventor
Arthur L. Parker, deceased,
By Helen M. Parker, executrix.
By
Mason, Porter & Diller
Attorneys

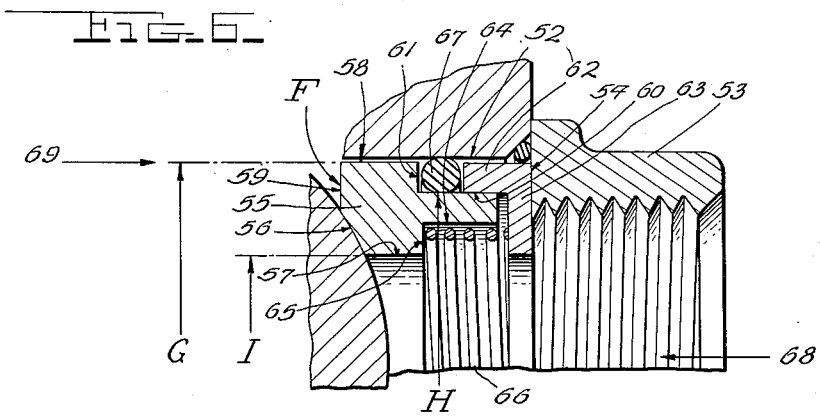
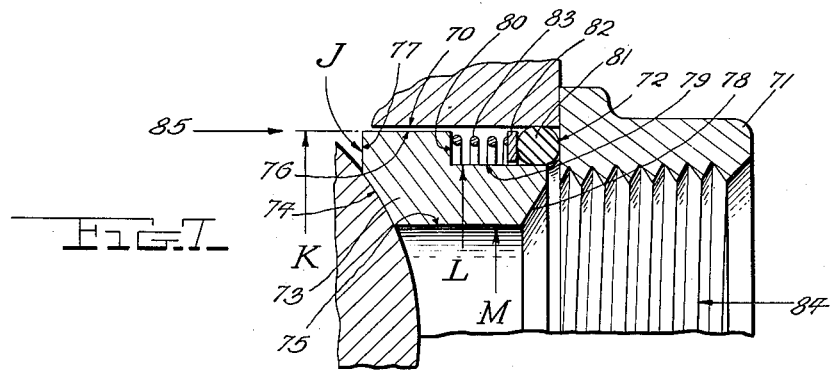
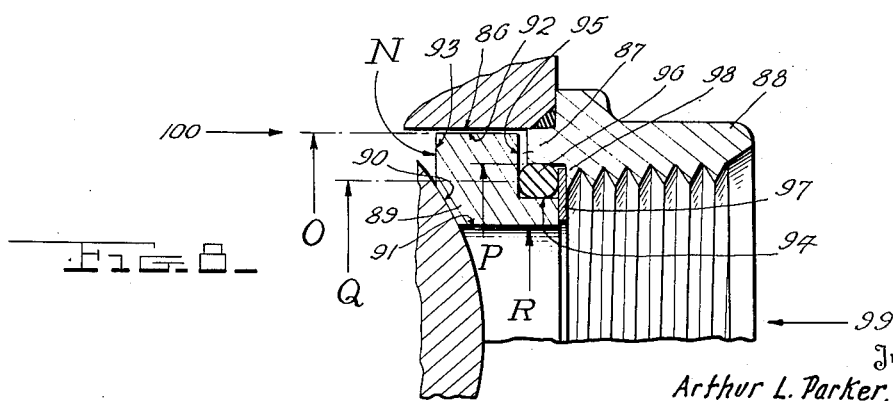
Inventor
Arthur L. Parker, deceased,
By Helen M. Parker, executrix.

Patented Feb. 10, 1953

2,628,060

UNITED STATES PATENT OFFICE 2,628,060

ROTARY PLUG VALVE SEAT

Arthur L. Parker, deceased, late of Cleveland, Ohio, by Helen M. Parker, executrix, Shaker Heights, Ohio, assignor to The Parker Appliance Company, Cleveland, Ohio, a corporation of Ohio Application May 15, 1945, Serial No. 593,796

12 Claims. (Cl. 251—113)

1

The invention relates generally to valves and primarily seeks to provide a novel valve structure embodying a casing element having at least one inlet flow passage or port and at least one outlet flow passage or port, a rotor element turnable for permitting or preventing flow of fluid through said flow passages or ports, and sealing ring means carried by one said element in position for engaging between the rotor element and the casing element and about a casing element flow passage or port for sealing the latter off, said sealing ring means being constructed and arranged in a novel manner assuring application of fluid pressure effective to force the ring means in sealing contact regardless of whether the dominant fluid pressure is from the direction of the rotor element toward the casing element flow passage or port or vice versa.

An object of the invention is to provide a valve assembly of the character stated including a casing having at least one inlet or outlet port, a rotor having a flow passage therethrough and turnable for permitting or preventing flow of fluid through selected casing and rotor flow passage and port equipments, and sealing ring means mounted in at least one casing port and engageable with the periphery of the rotor about said one casing port for sealing the same off when the rotor flow passage is turned out of communication therewith, said sealing ring means being constructed and arranged in a novel manner assuring application of fluid pressure effective to force the ring means into sealing contact with the rotor periphery regardless of whether the dominant fluid pressure is from the direction of the rotor or the port in which the ring means is mounted.

Another object of the invention is to provide a valve assembly of the character stated in which the sealing ring means engages at one end with the peripheral surface of the rotor and at its other end with an abutment shoulder in the casing port, and includes expansible means effective to constantly urge the opposite ends of the ring means against the rotor periphery and the abutment shoulder.

Another object of the invention is to provide novel sealing ring means of the character stated in which there is included a sealing ring formed of yieldable material and effective to prevent leakage about the sealing ring means in the port in which it is mounted.

With the above and other objects in view that will hereinafter appear, the nature of the invention will be more clearly understood by reference to the following detailed description, the appended claims, and the several views illustrated in the accompanying drawings.

In the drawings:

Figure 3 is a horizontal section taken on the line 3—3 on Figure 2.

Figure 4 is an enlarged fragmentary sectional view taken through one of the casing ports.

Figure 5 is a face view of the sealing ring per se.

Figure 6 is a view similar to Figure 4 illustrating a modified form of sealing ring means.

Figure 7 is a view similar to Figure 4 illustrating another modified form of sealing ring means.

Figure 8 is a view similar to Figure 4 illustrating still another modified form of sealing ring means.

Figure 1:
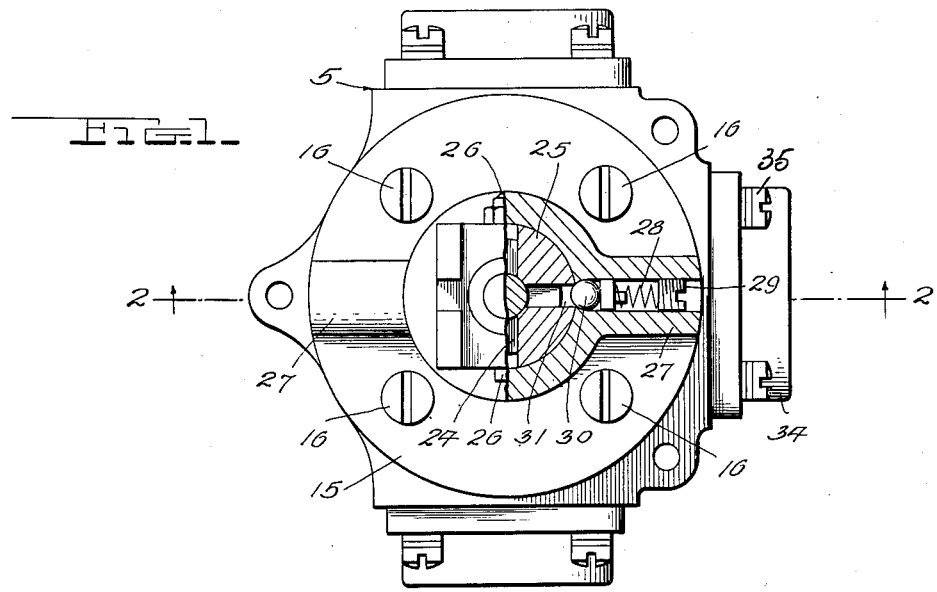
Figure 1 is a plan view illustrating a valve structure embodying the invention.

In the disclosure herein presented exemplifying the invention, the novel features are shown as incorporated in a valve in which the casing structure has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports. It is to be understood that the invention can be applied as well to various other forms of valve structures, that is to say sealing ring means comprehended by the invention may be employed in valve structures having port and flow passages differing in number and arrangement from those herein disclosed, and in which different forms of rotors are employed, as for example rotors other than cylindrical in shape or of the disk type.

In the form of the invention herein disclosed, the valve structure includes a casing element 5 having three radially disposed bores 6 all arranged in a common horizontal plane. Each of the bores 6 open into a large cylindriform rotor bore 7, and each end of the rotor bore is chamfered as at 8 to provide a seat for a sealing ring 9. The sealing ring at the bottom of the valve surrounds a boss 10 extending from a closure cap 11 forming a part of the casing structure as a whole and which is screw secured as at 12 to said casing element and which holds the ring in tight sealing contact with its seat. The cap 11 is equipped with a central inlet or discharge port 13.

The sealing ring or gasket 9 at the top of the valve surrounds a boss 14 extending from a closure cap 15 also forming a part of the casing structure as a whole and which is screw secured to the casing element as at 16, and the boss 14 like the previously mentioned cap boss 10, extends into the respective end of the rotor bore 7.

Figure 2:
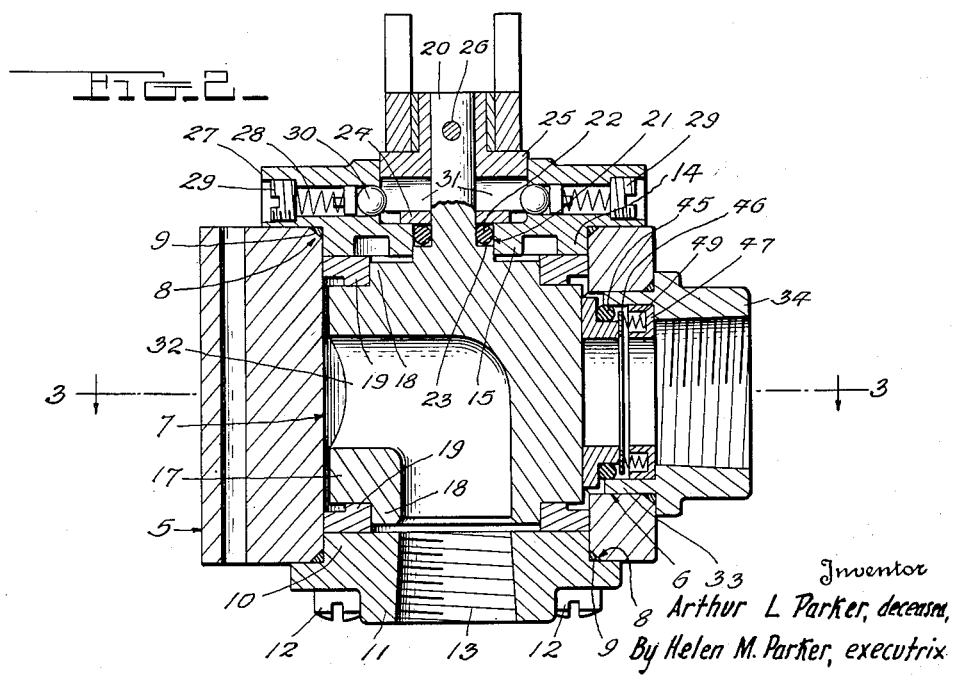
Figure 2 is a vertical cross section taken on the line 2—2 of Figure 1.

A valve rotor 17 is freely rotatably mounted in the rotor bore 7 and is equipped with bearing hubs 18 at the respective ends thereof which are rotatably received in non-metallic bearing rings 19 mounted in the casing element in a manner clearly illustrated in Figure 2. The rotor includes a reduced diameter stem extension 20 which passes through a center bore 21 in the cap 15 wherein it is surrounded by a packing ring 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadably mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations disposed in 90° spaced relation about the rotor center.

The rotor 17 is provided with an elbow flow passage 32 which constantly communicates with the casing structure bottom port 13 at one end and has its other end presented for selective communication with the several casing element port bores 6. The yieldable detent and recess equipments 30, 31 will yieldably retain the rotor in the off position in which its flow passage 32 will be out of communication with all of the casing ports as in Figures 2 and 3, or it will be yieldably held in position for registering with any selected one of the casing element ports.

Into the outer end of each casing bore 6 is fitted the positioning boss 33 of a port adapter 34 also forming a part of the casing structure as a whole and which is screw secured to the casing element as at 35, and each said port adapter is provided with a ring means receiving counterbore 36 providing an abutment shoulder 37.

The improved sealing means illustrated in Figures 1 through 5 includes a sealing ring 38 shaped at its inner face as at 39 to conform to and engage in sealing contact with the peripheral surface of the rotor 17. The inside diameter 40 of a particular ring defines the respective casing structure port, and the outside diameter 41 of said ring is freely slidable within the cylindrical port bore 6. The shaping of the inner face of the ring at 39 in the manner best illustrated in Figures 3, 4 and 5 of the drawings results in the provision of two diametrically oppositely disposed flat face portions 42 which are disposed in the plane of rotation of the rotor 17 and provide pressure areas C, the purpose of which will become apparent as this description progresses.

The ring 38 is provided with an annular clearance 43 at its outer end which is disposed in parallel spaced relation within the inner end of the respective casing structure adapter boss counterbore 36 and provides a shoulder 44 disposed perpendicularly with respect to the axis of the respective port bore and spaced a limited distance inwardly from the inner end of said boss. A sealing ring 45 of yieldable material engages in sealing contact with the opposing faces of the counterbore 36 of the casing structure adapter bars and the ring clearance 43. A clearance end ring 46 engages the outer end of the sealing ring 38, and an end ring 47 snugly fits within the respective casing structure adapter counterbore 36 and against the shoulder 37 provided thereby. Each ring 47 is provided with a multiple of spaced sockets 48 in which are mounted small stiff compression springs 49 which constantly urge the ring 47 against the abutment 37 and the sealing ring 38 against the periphery of the rotor 17.

It will be apparent by reference to Figure 3 of the drawings that one of the novel sealing ring means comprising the rings 38, 47, 46 and 45 and the compression springs 49 is mounted in each of the casing structure port bores. Because of the peculiar formation and association of the elements of these sealing ring structures and the areas presented thereby subject to fluid pressure acting in one direction or the other in a given port bore, when said pressure is dominant in the direction of the arrow 50, or to the left as viewed in Figure 4, said pressure will force the ring 45 against the shoulder 44 and thereby provide a ring seating pressure effect on the area E—D. In this case D is the inner limit of the surface area 39 contacting the periphery of the rotor 17. When fluid pressure is dominant in the direction of the arrow 51, or to the right as viewed in Figure 4, the yieldable sealing ring 45 will be forced away from the shoulder 44 and a pressure seating effect on area A—B minus both areas C or 42 will be produced. Thus it will be obvious that regardless of whether the fluid pressure is dominant in the direction of the arrow 50, or in the direction of the arrow 51, said pressure will be effective to urge the sealing ring 38 in sealing contact with the periphery of the rotor 17.

From the foregoing it should be apparent that the casing element 5, the bottom cap 10, the top cap 15 and the removably mounted port adapters 34 combine to form a casing structure wherein the rotor chamber and the several inlet and outlet ports are provided.

In Figure 6 there is illustrated a slight modification of the invention in which each port bore 52 has a port adapter 53 secured thereover. The port adapter has no boss extending into the port bore but serves to provide an abutment wall at 54. The sealing ring 55 is shaped at its inner face as at 56 to conform to and engage in sealing contact with the periphery of the rotor as in the previously described form of the invention. The inner diameter 57 of the ring 55 defines the port, the outer diameter 58 of said ring is freely slidable in the port bore 52, and like the ring of Figures 1 to 5 the ring also has two diametrically oppositely disposed flat faces 59 placed in the plane of rotation of the rotor and providing pressure areas F.

The ring 55 is provided with an annular recess 60 at its outer end, said recess providing an abutment shoulder 61 and a reduced diameter portion which projects into the annular flange portion 62 of an L-shaped abutment ring 63 which engages the port adapter abutment wall 54 in the manner clearly illustrated in Figure 6. The ring 55 is counterbored as at 64 to provide an abutment shoulder 65, and a compression spring 66 is interposed between said shoulder 65 and the opposing portion of the abutment ring 63 and serves to constantly and yieldably press the ring 63 against the abutment wall 54 and the sealing ring 55 against the periphery of the rotor. A yieldable sealing ring 67 is disposed in the recess in the outer end of the ring 55 and between the ring abutment shoulder 61 and the opposing end of the flange portion 62 of the ring 63. The ring 67 engages in sealing contact with the port bore 52 and the ring clearance wall 60 in the manner clearly illustrated in Figure 6.

Because of the peculiar structure and arrangement of the sealing ring means parts 55 and 63 above described pressure areas are provided which will be effective to press the ring 55 in sealing contact with the periphery of the rotor regardless of the direction of the dominant pressure outwardly or inwardly in a given port bore. When the fluid pressure is dominant in the outward direction as indicated by the arrow 69 on Figure 6 a ring seating pressure effect is provided on the area G—H minus both areas F or 59, and when the fluid pressure is dominant in the direction indicated by the arrow 68, a ring seating pressure effect is provided on the area G—I. It is to be understood that the yieldable sealing ring 67 is disposed so that it can be forced away from the shoulder 61 so as to permit the fluid pressure to act against said shoulder.

In Figure 7 of the drawings there is illustrated another modified form of the invention in which the port bore 70 has an adapter 71 mounted thereover. The adapter 71 has no boss extending into the port bore, but it provides an abutment wall at 72. The sealing ring 73 has its inner face shaped as at 74 to conform to and engage in sealing contact with the periphery of the rotor, and the inner diameter 75 of the ring defines the casing port and the outer diameter 76 thereof is freely slidable within the port bore 70 as in the previously described forms of the invention. This ring 73 also has two diametrically oppositely disposed flat faces 77 which provide pressure areas J similar in placement and function to the pressure areas C and F hereinbefore referred to.

The sealing ring 73 is beveled as at 78 at its outer end and is provided with an annular clearance 79 providing an abutment shoulder 80. A yieldable sealing ring 81 is mounted in the clearance and engages in sealing contact against the ring clearance wall 79, the port bore 70 and the adapter abutment wall 72, thus making it unnecessary to provide any sealing means between the adapter 71 and the casing surrounding the respective port bore 70. The yieldable sealing ring 81 is engaged by a ring 82, and a compression spring 83 is interposed between said ring and the abutment wall 80. The spring presses the ring 82 against the yieldable sealing ring 81 and serves the two fold purpose of holding said ring in tight sealing contact against the three wall portions above referred to and also to yieldably press the sealing ring 73 against the periphery of the rotor.

Because of the peculiar construction and arrangement of the parts comprising the sealing ring means of Figure 7, said means presents pressure areas effective to press the ring 73 in sealing contact with the periphery of the motor regardless of whether the fluid pressure is dominant in an outward or inward direction in the respective casing port bore. In this form of the invention, it is to be understood that the spring 83 is strong enough to retain the yieldable sealing ring 81 in sealing contact against the adapter wall 72 when the fluid pressure is dominant in the direction of the arrow 84 or to the left as viewed in Figure 7. In this case the pressure seating effect is on the ring area L—M, while when the fluid pressure is dominant in the direction of the arrow 85, or to the right as viewed in Figure 7, the pressure seating effect is on the area K—L minus both areas J or 77. As previously stated, the yieldable sealing ring provides a seal at its inner and outer surface against the port bore wall 70 and the ring clearance wall 79.

In Figure 8 of the drawings there is illustrated another modified form of the invention in which the port bore 86 receives the boss 87 of an adapter 88. The sealing ring 89 has its inner face shaped as at 90 to conform to and engage in sealing contact with the periphery of the rotor, and the inner diameter 91 of the ring defines the casing port and the outer diameter 92 thereof is freely slidable in the port bore 86 as in the previously described forms of the invention. This ring 89 also is provided with two diametrically oppositely disposed flat faces 93 providing pressure areas N which are placed and function in the same manner as in the other forms of the sealing ring.

The ring 89 is provided with an annular clearance 94 spaced in parallel relation inwardly of the adapter boss 87 and providing an abutment shoulder 95. A yieldable sealing ring 96 is disposed in the clearance and engages in sealing contact with the ring clearance surface 94, the abutment shoulder 95, the inner diameter of the adapter boss 87, and an end ring 97 which engages between the outer end of the sealing ring 89 and the adjacent face or abutment wall portion 98 of the adapter.

In this form of the invention as in the previously described forms, the construction and arrangement of the sealing ring means parts provide pressure areas which are acted upon by fluid pressure to effect a seating of the sealing ring 89 against the periphery of the rotor regardless of whether the fluid pressure is dominant in the outward or inward direction in the respective casing port bore. The sealing ring 96 serves not only to seal the four surfaces against which it contacts, but also to constantly urge the sealing ring 89 against the periphery of the rotor. When fluid pressure is dominant in the direction of the arrow 99 or to the left as viewed in Figure 8, the pressure seating is effected on area P—R, and when fluid pressure is dominant in the direction of the arrow 100 or to the right as viewed in Figure 8, the pressure seating is effected on an area at least O—Q minus both areas N or 93. It will also be apparent that this pressure area will be increased to the extent to which the seal effected by the inner face of the yieldable ring 96 does not extend to the diameter P.

In all forms of the improved sealing ring means herein described, pressure areas are provided which are effective to apply seating pressure on the respective sealing ring to hold it in sealing contact with the periphery of the rotor regardless of whether the fluid pressure dominant at a given time is being exerted outwardly into the respective port bore in the casing, or inwardly in said port bore toward the rotor. It will also be apparent that said pressure areas, except for the flat segments 42, 59, 77 and 93, constitute annular ring-like areas which do not differ materially in area when the dominant pressure is in the inward direction in the port bores as compared to when said pressure is in the outward direction in said bores.

While several forms of the invention have been illustrated, it is to be understood that other variations in the form and arrangement of the sealing ring means can be provided without departing from the spirit and scope of the invention as defined in the appended claims.

What is claimed is:

1. In a valve assembly, a casing structure having at least one first port bore and at least one second port bore, a rotor structure mounted in said casing structure and turnable for permitting or preventing flow of fluid through said bores, and sealing ring means carried by one said structure in position for engaging between the rotor structure and the casing structure about one of said bores for sealing the latter off, said sealing ring means presenting a first set of pressure areas for being acted upon by pressure of fluid having ingress through said first bore and a second and larger set of pressure areas for being acted upon by pressure of fluid from said second bore and about the rotor structure and out through said first bore, and including a rubber-like deformable ring mounted in position for engaging with and at least in part isolating said second set of pressure areas from the first set of pressure areas so that when pressure coming in through said first port bore toward the rotor structure is dominant it will be isolated from said second set of pressure areas and will act on said first set of pressure areas to press the sealing ring means into effective sealing contact with the structure other than the structure carrying the sealing means, said rubber-like ring being bodily shiftable out of its second pressure area isolating engagement when pressure coming in through said second port bore and about said rotor structure is dominant to permit said dominant pressure to act on said larger second set of pressure areas to press the sealing ring means into effective sealing contact with the structure other than said sealing ring means carrying structure, said rubber-like ring being shiftable bodily with the sealing ring means in one direction along the sealing ring means axis and being shiftable bodily relative to said sealing ring means and along the axis thereof in the opposite direction for making said first and second pressure area sets respectively effective in accordance with the direction of the dominant pressure.

2. In a valve assembly, a casing structure having at least one first port bore and at least one second port bore, a rotor structure mounted in said casing structure and turnable for permitting or preventing flow of fluid through said bores, and sealing ring means carried by the casing structure and engaging in sealing contact with the rotor structure about said one bore, said sealing ring means presenting one set of pressure areas for being acted upon by pressure of fluid having ingress through said first bore and a second and larger set of pressure areas for being acted upon by pressure of fluid from said second bore and about the rotor structure and out through said first bore, and including a rubber-like deformable ring mounted in position for engaging with and at least in part isolating said second set of pressure areas from the first set of pressure areas so that when pressure coming in through said first port bore toward the rotor structure is dominant it will be isolated from said second set of pressure areas and will act on said first set of pressure areas to press the sealing ring means into effective sealing contact with the rotor structure about said first port bore, said rubber-like ring being bodily shiftable out of its second pressure area isolating engagement when pressure coming in through said second port bore and about said rotor structure is dominant to permit said dominant pressure to act on said larger second set of pressure areas to press the sealing ring means into effective sealing contact with the rotor structure about said first port bore, said rubber-like ring being shiftable bodily with the sealing ring means in one direction along the sealing ring means axis and being shiftable bodily relative to said sealing ring means and along the axis thereof in the opposite direction for making said first and second pressure area sets respectively effective in accordance with the direction of the dominant pressure.

3. Valve structure as defined in claim 2 in which the rubber-like ring slidably engages with the casing structure in position for preventing passage of fluid from the casing structure about the rotor structure and the sealing ring means and through the first port bore.

4. Valve structure as defined in claim 2 in which there is also included in the sealing ring means, expansible means effective to yieldably retain the sealing contact of the sealing ring means with the rotor structure.

5. Valve structure as defined in claim 2 in which the rubber-like ring slidably engages with the casing structure in position for preventing passage of fluid from the casing structure about the rotor structure and the sealing ring means and through the first port bore and also serves as expansible means effective to yieldably retain the sealing contact of the sealing ring means with the rotor structure.

6. Valve structure as defined in claim 2 in which the rubber-like ring slidably engages with the casing structure in position for preventing passage of fluid from the casing structure about the rotor structure and the sealing ring means and through the first port bore and also forms a part of the first set of pressure areas.

7. Valve structure as defined in claim 2 in which the rubber-like ring is of a diameter for endwise opposing a portion of the second set of pressure areas and slidably engages with the casing structure in position for preventing passage of fluid from the casing structure about the rotor structure and the sealing ring means and through the first port bore, said rubber-like ring being movable along the axis of the sealing ring means by pressure entering through the first port bore into contact with the portion of the second set of pressure areas opposed thereby so as to reduce the effective area thereof and being displaceable from said contact with said second pressure area set portion by pressure about the rotor structure and toward the first port bore to bring about presentation of the full area of said second set of pressure areas for contact by said last named pressure.

8. In a valve assembly, a casing structure having at least one first port bore and at least one second port bore, a rotor structure mounted in said casing structure and turnable for permitting or preventing flow of fluid through said bores, and sealing ring means carried by the casing structure and engaging in sealing contact with the rotor structure about said one bore, said sealing ring means presenting one set of pressure areas for being acted upon by pressure of fluid having ingress through said first bore and a second and larger set of pressure areas for being acted upon by pressure of fluid from said second bore and about the rotor structure and out through said first bore, and including yieldable ring means for at least in part isolating said second set of pressure areas from the first set of pressure areas so that pressure entering from one or the other of said port bores, whichever one happens to be dominant, always will be effective against one said pressure area set to press the sealing ring means into effective sealing contact against the rotor structure about said first port bore, said sealing ring means including a rigid ring shaped at its inner face to conform to and engage in sealing contact with the periphery of the rotor structure and having an annular clearance in its periphery at its outer end providing an annular wall concentric to the sealing ring axis and an abutment shoulder perpendicular to said axis and providing an annular surface for receiving sealing ring seating fluid pressure coming about the sealing ring from the direction of the rotor structure, and a yieldable sealing ring surrounding said annular wall and engaging in sealing contact with said annular wall and a surrounding part of the casing structure and sealing off fluid pressure from the said first port bore from contact with said shoulder and itself forming part of an annular surface for receiving sealing ring seating pressure from said first port bore.

9. In a valve assembly, a casing structure having at least one first port bore and at least one second port bore, a rotor structure mounted in said casing structure and turnable for permitting or preventing flow of fluid through said bores, and sealing ring means carried by the casing structure and engaging in sealing contact with the rotor structure about said one bore, said sealing ring means presenting one set of pressure areas for being acted upon by pressure of fluid having ingress through said first bore and a second and larger set of pressure areas for being acted upon by pressure of fluid from said second bore and about the rotor structure and out through said first bore, and including yieldable ring means for at least in part isolating said second set of pressure areas from the first set of pressure areas so that pressure entering from one or the other of said port bores, whichever one happens to be dominant, always will be effective against one said pressure area set to press the sealing ring means into effective sealing contact against the rotor structure about said first port bore, said sealing ring means including a rigid ring shaped at its inner face to conform to and engage in sealing contact with the periphery of the rotor structure and having an annular clearance in its periphery at its outer end providing an annular wall concentric to the sealing ring axis and an abutment shoulder perpendicular to said axis and providing an annular surface for receiving sealing ring seating fluid pressure coming about the sealing ring from the direction of the rotor structure, a yieldable sealing ring engaging in sealing contact with said annular wall and a surrounding part of the casing structure and sealing off fluid pressure from the said first port bore from contact with said shoulder and itself forming part of an annular surface for receiving sealing ring seating pressure from said first port bore, said casing structure including a port adapter in which said first port bore is formed and providing an abutment wall, an abutment ring engaging said abutment wall, and spring means constantly urging the abutment ring against the abutment wall and the rigid ring against the rotor structure.

10. In a valve assembly, a casing structure having at least one first port bore and at least one second port bore, a rotor structure mounted in said casing structure and turnable for permitting or preventing flow of fluid through said bores, and sealing ring means carried by the casing structure and engaging in sealing contact with the rotor structure about said one bore, said sealing ring means presenting one set of pressure areas for being acted upon by pressure of fluid having ingress through said first bore and a second and larger set of pressure areas for being acted upon by pressure of fluid from said second bore and about the rotor structure and out through said first bore, and including yieldable ring means for at least in part isolating said second set of pressure areas from the first set of pressure areas so that pressure entering from one or the other of said port bores, whichever one happens to be dominant, always will be effective against one said pressure area set to press the sealing ring means into effective sealing contact against the rotor structure about said first port bore, said sealing ring means including a rigid ring shaped at its inner face to conform to and engage in sealing contact with the periphery of the rotor structure and having an annular clearance in its periphery at its outer end providing an annular wall concentric to the sealing ring axis and an abutment shoulder perpendicular to said axis and providing an annular surface for receiving sealing ring seating fluid pressure coming about the sealing ring from the direction of the rotor structure, a yieldable sealing ring engaging in sealing contact with said annular wall and a surrounding part of the casing structure and sealing off fluid pressure from the said first port bore from contact with said shoulder and itself forming part of an annular surface for receiving sealing ring seating pressure from said first port bore, said casing including a port adapter in which said first port bore is formed and providing an abutment wall, an abutment ring engaging the face of the yieldable ring opposed to said abutment shoulder, and spring means between said abutment shoulder and said abutment ring and serving to press the yieldable ring in sealing contact against the abutment wall and said surrounding casing structure part and the rigid ring against the rotor, the annular portion of said rigid ring surrounded by said yieldable ring presenting a pressure surface to be acted upon by fluid pressure from said first port bore toward the rotor structure.

11. In a valve assembly, a casing structure having at least one first port bore and at least one second port bore, a rotor structure mounted in said casing structure and turnable for permitting or preventing flow of fluid through said bores, and sealing ring means carried by the casing structure and engaging in sealing contact with the rotor structure about said one bore, said sealing ring means presenting one set of pressure areas for being acted upon by pressure of fluid having ingress through said first bore and a second and larger set of pressure areas for being acted upon by pressure of fluid from said second bore and about the rotor structure and out through said first bore, and including yieldable ring means for at least in part isolating said second set of pressure areas from the first set of pressure areas so that pressure entering from one or the other of said port bores, whichever one happens to be dominant, always will be effective against one said pressure area set to press the sealing ring means into effective sealing contact against the rotor structure about said first port bore, said sealing ring means including a rigid ring shaped at its inner face to conform to and engage in sealing contact with the periphery of the rotor structure and having an annular clearance in its periphery at its outer end providing an annular wall concentric to the sealing ring axis and an abutment shoulder perpendicular to said axis and providing an annular surface for receiving sealing ring seating fluid pressure coming about the sealing ring from the direction of the rotor structure, a yieldable sealing ring engaging in sealing contact with said annular wall and a surrounding part of the casing structure and sealing off fluid pressure from the said first port bore from contact with said shoulder and itself forming part of an annular surface for receiving sealing ring seating pressure from said first port bore, said casing structure including a port adapter secured to the casing structure about said first port bore and having an abutment wall portion and a boss extending into said first port bore short of engagement with said abutment shoulder and providing said surrounding casing part, said yieldable sealing ring being resisted against endwise movement by said abutment wall portion and axially deformed against said abutment shoulder so as to constantly urge the rigid ring against the rotor structure.

12. In a valve assembly, a casing structure having at least one first port bore and at least one second port bore, a rotor structure mounted in said casing structure and turnable for permitting or preventing flow of fluid through said bores, and sealing ring means carried by the casing structure and engaging in sealing contact with the rotor structure about said one bore, said sealing ring means presenting one set of pressure areas for being acted upon by pressure of fluid having ingress through said first bore and a second and larger set of pressure areas for being acted upon by pressure of fluid from said second bore and about the rotor structure and out through said first bore, and including yieldable ring means for at least in part isolating said second set of pressure areas from the first set of pressure areas so that pressure entering from one or the other of said port bores, whichever one happens to be dominant, always will be effective against one said pressure area set to press the sealing ring means into effective sealing contact against the rotor structure about said first port bore, said sealing ring means including a rigid ring shaped at its inner face to conform to and engage in sealing contact with the periphery of the rotor structure and having an annular clearance in its periphery at its outer end providing an annular wall concentric to the sealing ring axis and an abutment shoulder perpendicular to said axis and providing an annular surface for receiving sealing ring seating fluid pressure coming about the sealing ring from the direction of the rotor structure, a yieldable sealing ring engaging in sealing contact with said annular wall and the surrounding said first port bore and sealing off fluid pressure from the said first port bore from contact with said shoulder and itself forming part of an annular surface for receiving sealing ring seating pressure from said first port bore, said casing structure including a port adapter secured to the casing structure about said first port bore and providing an abutment wall, an L-shaped end ring engaging said abutment wall and having an annular flange portion extending about said concentric wall in position for forming an end abutment for the yieldable sealing ring, and spring means between the rigid sealing ring and the end ring yieldably urging the end ring against the abutment wall and the rigid sealing ring against the rotor structure.

HELEN M. PARKER,
*Executrix of the Estate of Arthur L. Parker, deceased.*

REFERENCES CITED

The following references are of record in the file of this patent:

UNITED STATES PATENTS

| Number | Name | Date |
|---|---|---|
| 2,191,232 | Heinen | Feb. 20, 1940 |